United States Patent
Maeda et al.

(10) Patent No.: US 8,098,448 B2
(45) Date of Patent: Jan. 17, 2012

(54) METHOD FOR SETTING ZONE FORMAT OF A DISK FOR STORING DATA AND DISK DRIVE

(75) Inventors: Yoshihiko Maeda, Kanagawa (JP);
Masaomi Ikeda, Kanagawa (JP);
Nobuhiro Kuwamura, Kanagawa (JP);
Toshihiko Tsunokawa, Kanagawa (JP);
Akira Osaki, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/639,926

(22) Filed: Dec. 16, 2009

(65) Prior Publication Data
US 2011/0085259 A1    Apr. 14, 2011

(30) Foreign Application Priority Data
Dec. 16, 2008   (JP) .................................. 2008-320331

(51) Int. Cl.
*G11B 5/09* (2006.01)
(52) U.S. Cl. ........................................... 360/48; 360/53
(58) Field of Classification Search ........................ None
See application file for complete search history.

(56) References Cited

U.S. PATENT DOCUMENTS

| 7,317,587 B2 * | 1/2008 | Furuhashi et al. ............... 360/48 |
| 7,463,438 B2 * | 12/2008 | Kosugi et al. ................... 360/31 |
| 2006/0082918 A1 | 4/2006 | Kosugi et al. |

FOREIGN PATENT DOCUMENTS

| JP | 05012807 | 1/1993 |
| JP | 07021504 | 1/1995 |
| JP | 10143811 | 5/1998 |
| JP | 2000123492 | 4/2000 |

* cited by examiner

*Primary Examiner* — Daniell L Negron
*Assistant Examiner* — Regina N Holder

(57) ABSTRACT

A method for dividing a data area on a disk into a plurality of concentric zones and determining a format for each zone so that data tracks in the zone have the same number of data sectors. The method includes dividing a data area into a plurality of zones with provisional boundaries. The method also includes determining a linear recording density for a selected zone. The method further includes selecting the number of data sectors per data track corresponding to the determined linear recording density from specified values. Moreover, the method includes resetting a boundary of the zone at a new boundary shifted from the provisional boundary according to a selected value.

18 Claims, 10 Drawing Sheets

METHOD FOR SETTING ZONE FORMAT OF A DISK FOR STORING DATA AND DISK DRIVE

CROSS-REFERENCE TO RELATED APPLICATION

This application claims priority from the Japanese Patent Application No. 2008-320331, filed Dec. 16, 2008, the disclosure of which is incorporated herein in its entirety by reference.

TECHNICAL FIELD

Embodiments of the present invention relate to a method for setting a zone format of a disk for storing data and a disk drive performing the method.

BACKGROUND

Disk drives are known in the art that use various kinds of disks, such as: optical disks, magneto-optical disks, flexible magnetic-recording disks, and similar disk data-storage devices. In particular, hard-disk drives (HDDs) have been widely used as indispensable data-storage devices for current computer systems. Moreover, HDDs have found widespread application to moving image recording and reproducing apparatuses, car navigation systems, cellular phones, and similar devices, in addition to the computers, due to their outstanding information-storage characteristics.

A magnetic-recording disk used in a HDD has multiple concentric data tracks and servo tracks. A servo track consists of multiple servo sectors having address information. A data track consists of multiple data sectors containing user data. A data sector is recorded between separate servo sectors in the circumferential direction of the magnetic-recording disk. A magnetic-recording head of a head-slider supported by a rotary actuator accesses designated data sectors according to address information in servo sectors to write data to, and read data from, data sectors.

Engineers and scientists engaged in HDD manufacturing and development are interested in the design of HDDs that control the distribution of data in data sectors on the magnetic-recording disk to meet the rising demands of the marketplace for increased data-storage capacity, and performance.

SUMMARY

Embodiments of the present invention include a method for dividing a data area on a disk into a plurality of concentric zones and determining a format for each zone so that data tracks in the zone have the same number of data sectors. The method includes dividing a data area into a plurality of zones with provisional boundaries. The method also includes determining a linear recording density for a selected zone. The method further includes selecting the number of data sectors per data track corresponding to the determined linear recording density from specified values. Moreover, the method includes resetting a boundary of the zone at a new boundary shifted from the provisional boundary according to a selected value.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
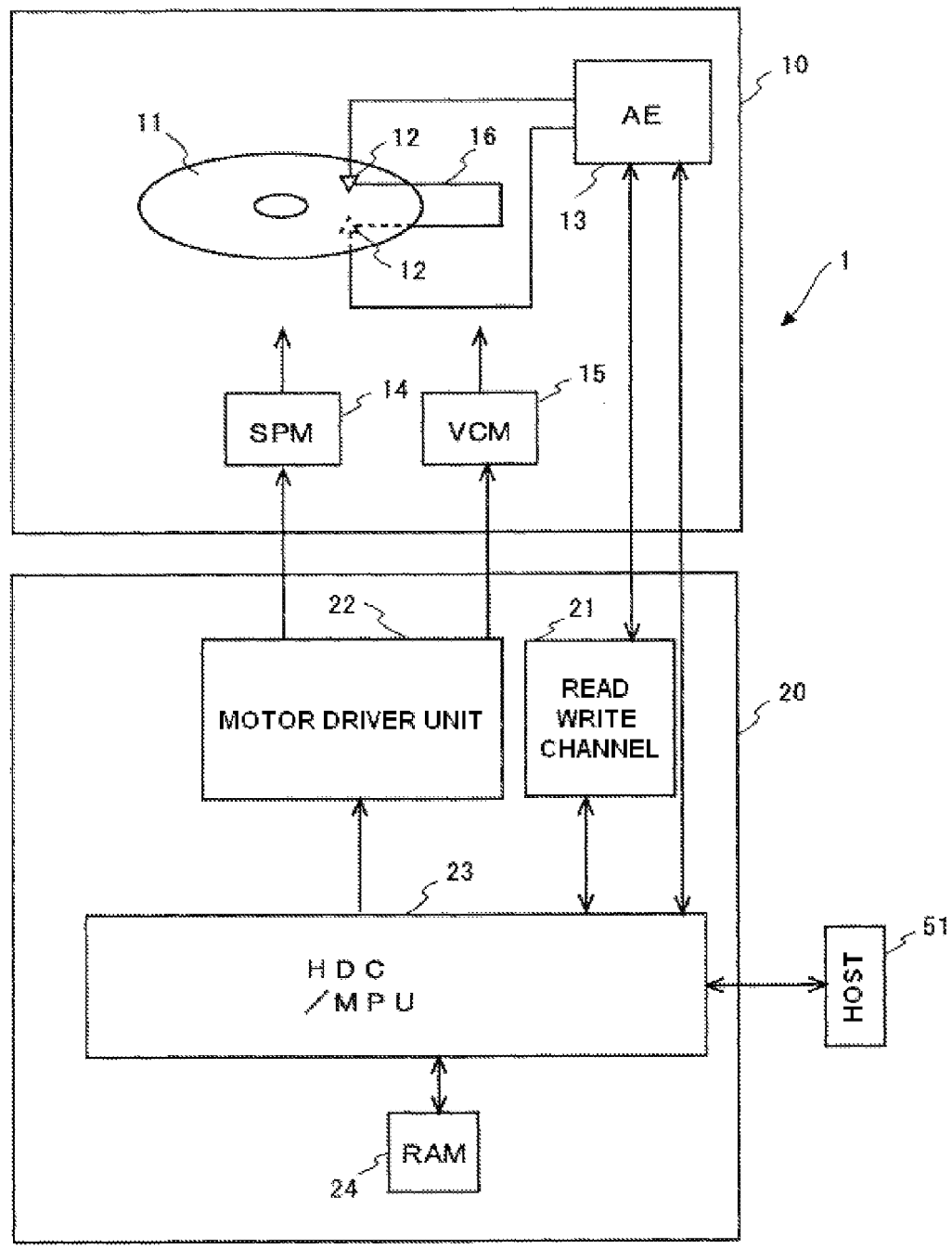
FIG. 1 is a block diagram schematically illustrating the configuration of a hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.
Description of Embodiments of the Present Invention for a Method for Setting Zone Format of a Disk for Storing Data and a Disk Drive With relevance to embodiments of the present invention, in order to increase the recording density of a magnetic-recording disk or improve the reliability of a HDD, as is known in the art, a data track pitch may be set for each magnetic-recording head, which corresponds to each recording surface of the magnetic-recording disk. The data track pitch determined according to the properties of a magnetic-recording head such as read width, and write width, allows suppressing an effect on adjacent data tracks in writing of data, as well as, increasing the data capacity of a recording surface.

In a HDD, a recording surface is divided into a plurality of zones in the radial direction and different linear recording densities, as measured by the parameter, known in the art as, "bits-per-inch," or "BPI," are assigned to the zones. Assigning higher BPIs to outer zones allows increasing the storage capacity of a recording surface. In a zone, the recording frequency is constant, and the BPIs of data tracks are different. The innermost data track in a zone has the largest BPI. The error rate of a magnetic-recording disk depends on the BPI. The error rate increases with increasing BPI.

In a HDD, the upper limit of error rate is defined in order to ensure reliability. In setting the BPI for each zone, the BPI is determined so that the error rate of each zone is less than a specified value. Additionally, the error rate depends on the properties of a magnetic-recording head. Because recent advances in magnetic-recording technology have led to higher recording densities in HDDs, the error rate changes depending on the magnetic-recording-head manufacturing tolerances.

Therefore, as is known in the art, the error rate of each zone is measured; and, a recording frequency is set that is appropriate for the magnetic-recording-head properties for each zone. The method writes and reads data in each zone with a magnetic-recording head and measures the error rate. The method sets the recording frequency corresponding to each zone so that the error rate is less than a specified value. Thus, error rate less than a specified value in each zone and specified storage capacity of a recording surface may be provided.

A HDD stores user data in data sectors. A data sector has a specific format and stores a specific length of user data, for example, user data with a 512 byte length. Access of user data in a HDD is carried out by designating the addresses of the user data. A data sector is a unit of storing; and, a data track consists of a natural number of data sectors.

Figure 11:
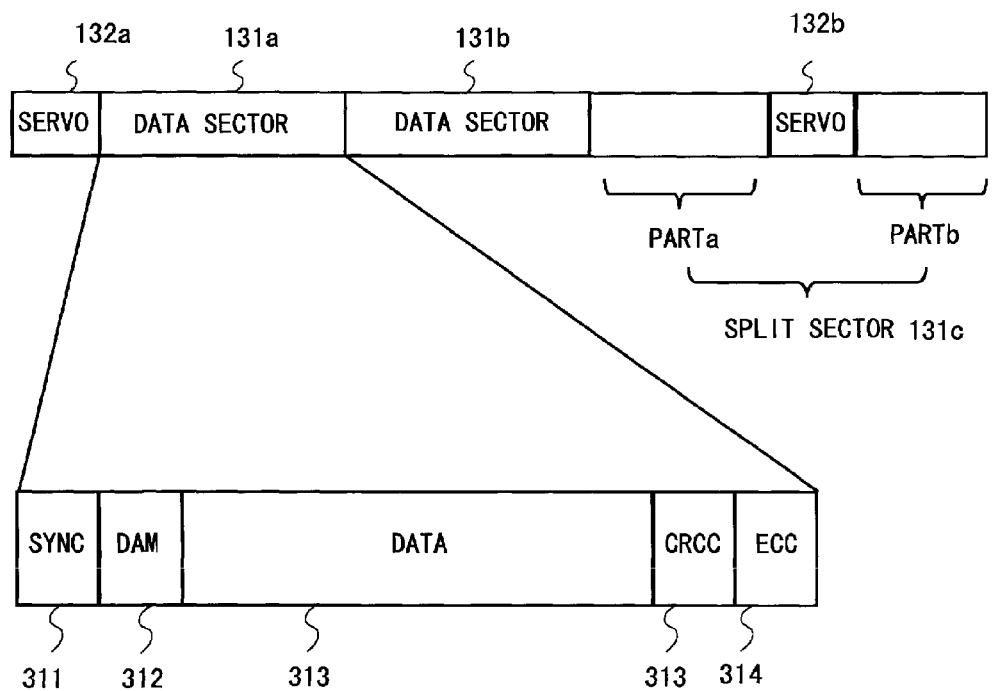
FIG. 11 is a drawing schematically illustrating a physical format of data recorded in a data track, in accordance with related art.

With reference now to FIG. 11, with relevance for embodiments of the present invention, as is known in the art, a drawing is shown that schematically illustrates the physical format of data recorded in a data track. A data track includes a plurality of data sectors. In FIG. 11, three data sectors 131a to 131c are illustrated. Servo sectors are disposed at regular intervals to separate data sectors, or a single data sector. In FIG. 11, two servo sectors 132a and 132b are illustrated.

The data sectors 131a to 131c in the data track can be categorized into two types. One is a split sector that is split by a servo sector 132b; and, the others are normal data sectors that are not split, referred to as non-split sectors. In the example of FIG. 11, the data sectors 131a and 131b are not split by a servo sector and are normal sectors. On the other hand, the data sector 131c is split by the servo sector 132b and is a split sector.

A non-split sector and a split sector have different data formats. FIG. 11 illustrates the data format of the data sector 131a as a non-split data sector. The data sector 131a has the fields of sync (SYNC) 311, data address mark (DAM) 312, user data section 313, cyclic redundancy check code (CRCC) 314 and error correction code (ECC) 315. The BPI is defined by the user data section 313. The BPI is determined by the number of bits in the user data section 313 and the length, for example, in units of an inch, of the user data section 313. The BPI is also determined from the recording frequency and the radial position of a data track. The length of the user data section 313 changes with the radial position at the same data rate. In a zone, the BPI values of tracks decrease from the innermost data track toward the outermost data track.

The sync 311 is a constant frequency signal. A PLL circuit in a RW channel operates in synchronization with the sync 311; and, a variable gain amplifier (VGA) adjusts the gain according to the sync 311. The DAM indicates the start of the user data and sync data for reading the subsequent user data. The CRCC 314 and the ECC 315 are added to correct errors in recording of data to a magnetic-recording disk. A HDD corrects errors in read data with the ECC 315, and uses the CRCC 314 for checking the error correction.

The split sector 131c is split into two portions, a PART a and a PART b, by a servo sector 132b. Each of the PART a and the PART b has the same format as the data sector 131a. Therefore, the amount of data other than user data is larger in a split sector than a non-split sector.

A split sector is more redundant than a non-split sector. Thus, reducing the number of split sectors in a data track allows increasing the user data capacity in the data track. The number of servo sectors on a recording surface is predefined. Therefore, if the number of data sectors contained in a data track is selected from values to reduce split sectors according to the number of servo sectors, the recording density of user data on a recording surface is increased.

The number of data sectors included in a data track is the same in a zone. If the BPI of a zone is determined, the number of data sectors in a data track is determined. Thus, embodiments of the present invention provide a technique to determine the BPI to match with an efficient number of data sectors in a data track so as to increase the user data recording density, which determines the data capacity, on a recording surface.

Embodiments of the present invention includes a method for dividing a data area on a disk into a plurality of concentric zones and determining a format for each zone so that data tracks in the zone have the same number of data sectors. In accordance with embodiments of the present invention, the method divides a data area into a plurality of zones with provisional boundaries. In accordance with embodiments of the present invention, the method determines a linear recording density for a selected zone. In accordance with embodiments of the present invention, the method selects the number of data sectors per data track corresponding to the determined linear recording density from specified values. In accordance with embodiments of the present invention, the method resets a boundary of the zone at a new boundary shifted from the provisional boundary according to a selected value. Thus, in accordance with embodiments of the present invention, the method can increase the capacity of user data on a recording surface while setting an appropriate linear recording density for each zone.

In one embodiment of the present invention, an error rate is measured in the data area, and the linear recording density is determined according to the error rate. Thus, in accordance with embodiments of the present invention, the method allows determining a proper recording density for each head. In another embodiment of the present invention, error rates are measured in a portion of the plurality of zones and the relationship between the error rate and the linear recording density in the portion of the plurality of zones is determined; and, the linear recording density corresponding to a reference error rate of the selected zone is determined from the relationship. Thus, in accordance with embodiments of the present invention, the method provides a more appropriate recording density. Alternatively, in accordance with embodiments of the present invention, the error rate measurement in the data area measures an effect on an adjacent track by a recording element. Thus, in accordance with embodiments of the present invention, the method allows more appropriately determining the recording density according to the error rate.

In another embodiment of the present invention, the number of data sectors per data track at a provisional boundary of the zone corresponding to the linear recording density at the provisional boundary is calculated; and, a boundary of the zone is shifted according to a difference between the calculated number of data sectors and the selected value. Thus, in accordance with embodiments of the present invention, the method provides an appropriate boundary according to the number of data sectors. Furthermore, in another embodiment of the present invention, the boundary of the zone is shifted inward from the provisional boundary if the selected value is less than the calculated number of data sectors. Thus, in accordance with embodiments of the present invention, the method increases the data capacity. In another embodiment of the present invention, the boundary of the zone is shifted outward from the provisional boundary if the selected value is larger than the calculated number of data sectors. Thus, in accordance with embodiments of the present invention, the method increases the data capacity.

In another embodiment of the present invention, a value smaller than or larger than the calculated number of data sectors is selected from the specified values according to a specified condition; the boundary of the zone is shifted inward from the provisional boundary if the selected value is less than the calculated number of data sectors; and, the boundary of the zone is shifted outward from the provisional boundary if the selected value is larger than the calculated number of data sectors according to the selected value. Thus, in accordance with embodiments of the present invention, the method allows determining a boundary so that the data capacity increases. In another embodiment of the present invention, the value closest to the calculated number of data sectors is selected from the specified values. Thus, in accordance with embodiments of the present invention, the method allows determining an appropriate value for the number of data sectors. In another embodiment of the present invention, the calculation of the number of data sectors corrects variations in gaps between servo sectors and data sectors with the radial position on the disk. Thus, in accordance with embodiments of the present invention, the method provides more precise calculation.

In accordance with embodiments of the present invention, a disk drive includes: a disk including a data area, a head for accessing the data area, a moving mechanism for supporting and moving the head in proximity with the data area, and a controller configured to divide the data area into a plurality of zones with provisional boundaries, configured to determine a linear recording density for a selected zone, configured to select the number of data sectors per data track corresponding to the determined linear recording density from specified values, and configured to reset a boundary of the zone at a new boundary shifted from the provisional boundary. Thus, in accordance with embodiments of the present invention, the controller can increase the capacity of user data on a recording surface while setting an appropriate linear recording density for each zone.

Embodiments of the present invention can increase the capacity of user data on a recording surface while setting an appropriate linear recording density for each zone. Embodiments of the present invention are subsequently described by way of example of: a hard-disk drive (HDD), which is an example of a disk drive; a magnetic-recording head, which is an example of a head; and, a magnetic-recording disk, which is an example of a disk. Embodiments of the present invention set the zone format of a recording surface. In accordance with embodiments of the present invention, a method determines the linear recording density of each zone depending on measurement results on a recording surface with a magnetic-recording head. As used herein, bits/inch (BPI) is used as a unit of measurement of linear recording density. As described herein, a measurement value for determining an appropriate BPI is an error rate. Thus, in accordance with embodiments of the present invention, a BPI which is set for the error rate to satisfy a reference criterion achieves suitable performance and reliability of a HDD.

In a zone, the number of data sectors in a data track is constant and the BPI changes in the zone. However, if the BPI of one data track is determined, the number of data sectors in each data track is determined in the zone and the BPIs of the other data tracks are determined. The BPI of the innermost data track is the largest. Thus, if the BPI of the innermost data track is determined so that a reference error rate is satisfied, the BPI and the reference error rate in the other outer data tracks are satisfied.

Furthermore, in accordance with embodiments of the present invention, the method selects the number of data sectors to be assigned to each zone from specified numbers. In accordance with embodiments of the present invention, the number of data sectors to be assigned to each zone is not arbitrary, but selected from a group of predetermined numbers. In accordance with embodiments of the present invention, the number of data sectors is selected so that the number of split sectors in a data track is a specified number or less. Thus, embodiments of the present invention reduce the redundancy in the data track and increase the storage capacity of user data, for example, as measured by recording density per data track.

In accordance with embodiments of the present invention, the method selects the number of data sectors corresponding to an appropriate BPI determined by measurement from the specified group and assigns the value to a zone. Further, in accordance with embodiments of the present invention, the method resets the boundary of the zone according to the assigned number of data sectors. Thus, in accordance with embodiments of the present invention, the data capacity of the recording surface is increased. Before describing zone format setting, in accordance with embodiments of the present invention, the configuration of a HDD is next described.

With reference now to FIG. 1, in accordance with embodiments of the present invention, a block diagram is shown that schematically illustrates the configuration of HDD 1. HDD 1 has a circuit board 20 fixed on the outer surface of a disk enclosure (DE) 10. On the circuit board 20, circuit elements are mounted such as a read/write channel (RW channel) 21, a motor driver unit 22, an integrated circuit that is a hard disk controller/microprocessor unit (HDC/MPU) 23, and a random access memory (RAM) 24. In the DE 10, a spindle motor (SPM) 14 spins a magnetic-recording disk 11, which is a disk for storing data, at a specific angular rate. The motor driver unit 22 drives SPM 14 according to control data from HDC/MPU 23.

Each of the head-sliders 12 includes a slider for flying in proximity with the recording surface of the magnetic-recording disk, and a magnetic-recording head secured on the slider for carrying out the conversion between magnetic signals and electric signals. An arm electronics (AE) module 13 selects a head-slider 12 to access, for example, for reading data from, or writing data to, the magnetic-recording disk 11 from the plurality of head-sliders 12 according to control data from HDC/MPU 23, and amplifies read-back signals and write signals.

The head-sliders 12 are fixed at the distal end portion of an actuator 16. The actuator 16 is connected to a voice coil motor (VCM) 15 and rotates about a pivot shaft to move the head-sliders 12 in proximity with the recording surface of the spinning magnetic-recording disk 11 along the radial direction of the magnetic-recording disk 11. The assembly of the actuator 16 and the VCM 15 is a mechanism for moving the magnetic-recording head. The motor driver unit 22 drives the VCM 15 according to control data from HDC/MPU 23.

The RW channel 21, in a read operation, extracts data from the obtained read-back signals, and decodes the data. The decoded data are supplied to HDC/MPU 23. The RW channel 21, in a write operation, code-modulates write data supplied from HDC/MPU 23, converts the code-modulated data into write signals, and then supplies the write signals to the AE module 13. The HDC in HDC/MPU 23 is a logic circuit; and, the MPU operates in accordance with micro-codes loaded to RAM 24. HDC/MPU 23 is an example of a controller; and, HDC/MPU 23 performs the control of HDD 1 in addition to other processes concerning data processing, such as: positioning control, interface control, and defect management.

Figure 2:
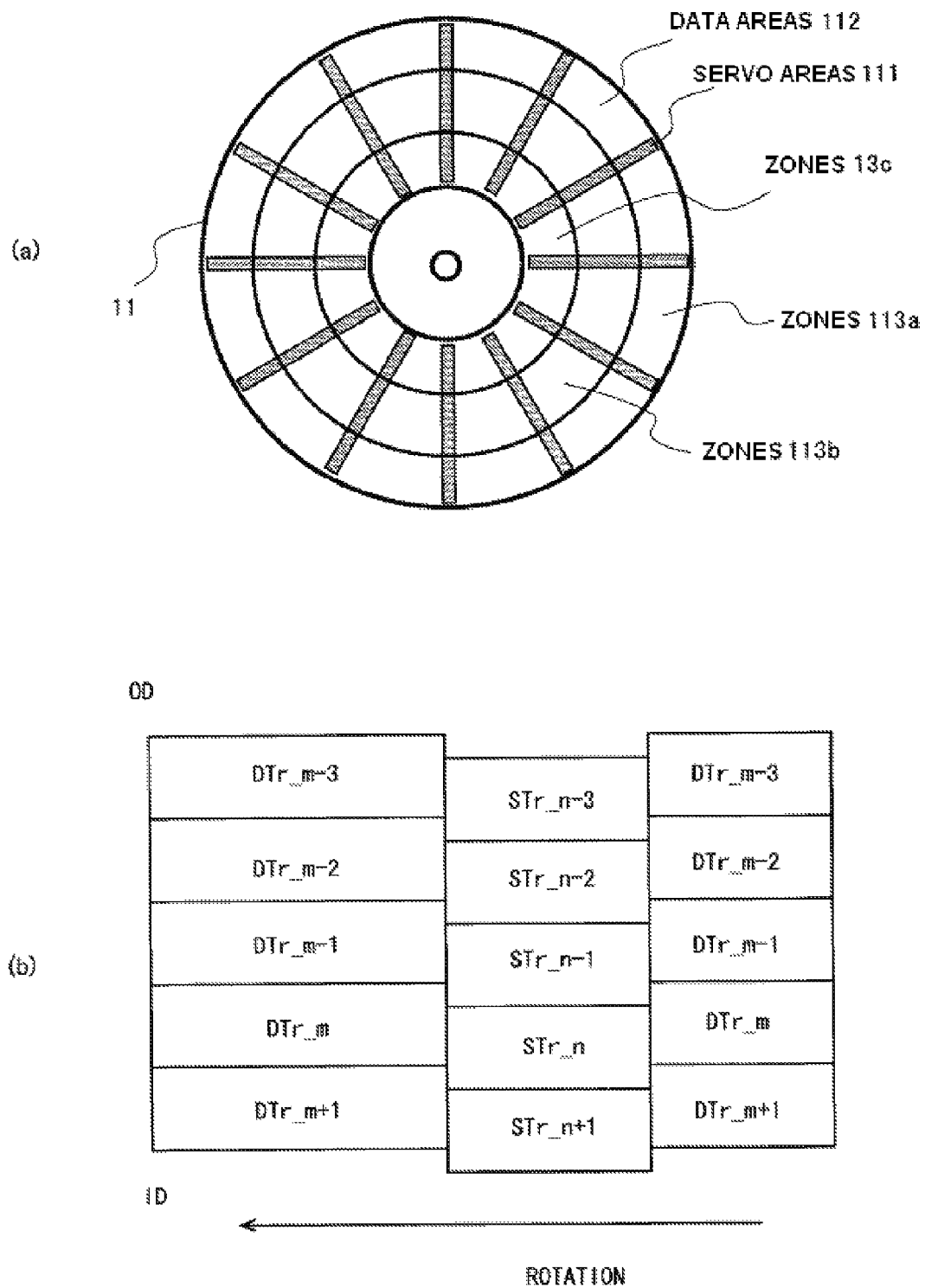
FIGS. 2(a) and 2(b) are drawings schematically illustrating a recording surface of a magnetic-recording disk and the data format of a portion of the recording surface, respectively, in accordance with an embodiment of the present invention.

With reference now to FIGS. 2(a) and 2(b), in accordance with embodiments of the present invention, a drawing is shown in FIG. 2(a) that schematically illustrates the data configuration on a recording surface of the magnetic-recording disk 11; and, in FIG. 2 (b), a drawing is shown that schematically illustrates the data format of a portion of the recording surface. A plurality of servo regions 111 extending radially and formed at regular intervals in the circumferential direction and data regions 112 each of which is provided between two adjoining servo regions 111 are formed on the recording surface of the magnetic-recording disk 11. Servo data for positioning control of the head-slider 12 are recorded in each servo region 111. User data and data used for the control of HDD 1 are recorded in data areas 112.

Concentric data tracks 114 are formed on a recording surface of the magnetic-recording disk 11. The data track (DTr) 114 has a specific width in the radial direction. User data are recorded along the data tracks 114. One data track 114 includes a data sector, a recording unit for user data, and typically consists of a plurality of data sectors. Data sectors contain user data with the same data length and the addresses of data sectors are designated in reading operations, or writing operations, of user data.

Data tracks on a recording surface are grouped into a plurality of zones according to the radial positions. Each zone consists of consecutive data tracks in the radial direction. In FIG. 2 (a), three zones 113a to 113c are illustrated. A track per inch (TPI), which is data track density, and a BPI are set for each zone.

The magnetic-recording disk 11 has concentric servo tracks 115. A servo track (STr) 115 has a specific width in the radial direction and consists of multiple servo sectors separated by data regions 112. A servo sector includes: a servo track number, a servo sector number in the servo track, and a burst pattern for fine positioning. The amplitude of the read-back signal of the burst pattern can determine the position in the servo track.

As shown in FIG. 2 (b), in one configuration, in accordance with embodiments of the present invention, the servo track pitch and the data track pitch in the user area do not coincide with each other on a recording surface. Data track pitches are determined individually according to the properties of head-sliders 12. Determining the data track pitch for each head-slider 12 provides the optimum data track pitch for the properties of head-slider 12, reduction of the effect on adjacent data tracks in data writing, and an increase in the storage capacity, as provided by an increase in the number of data tracks. Embodiments of the present invention can also be applied to a format in which the data track pitch and the servo track pitch coincide with each other.

The present embodiment provides for setting the BPI of each zone. A BPI setting method in setting a zone format is next described specifically. Setting of a zone format is performed after assembling a head disk assembly (HDA), which is an assembly obtained by removing the circuit board 20 from the HDD 1, and the servo writing operation in manufacturing of HDD 1.

The controller on the control circuit board to be mounted on HDD 1, or alternatively, a dedicated controller for producing HDDs, may set the zone format. In a subsequently described example, the controller to be included in the product HDD 1 sets the zone format. Whichever of the product controller or the dedicated controller performs the process, a HDD includes a HDA and a controller.

Figure 3:
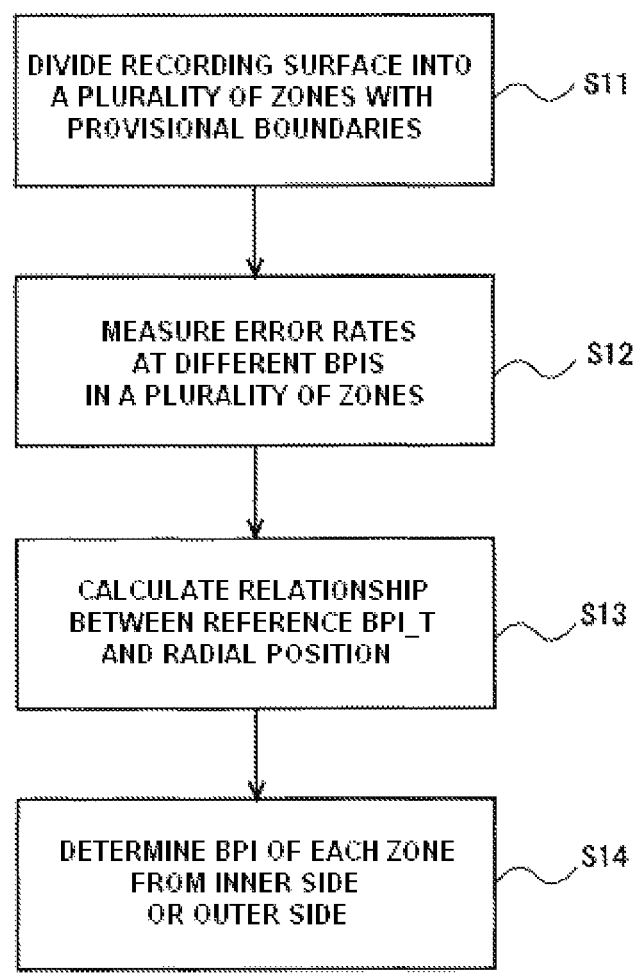
FIG. 3 is a flowchart showing the flow of a process for setting bits per inch (BPIs) for all zones on a recording surface performed by the hard-disk controller/microprocessor unit (HDC/MPU), in accordance with an embodiment of the present invention.

With reference now to FIG. 3, in accordance with embodiments of the present invention, a flowchart depicts the flow of a process for setting BPIs for all zones on a recording surface performed by HDC/MPU 23. HDC/MPU 23 performs and controls a zone format setting process. HDC/MPU 23 sets a BPI after setting a TPI for each zone. At S11, HDC/MPU 23 divides a selected recording surface into a plurality of zones at provisional boundaries. Methods for determining the provisional boundaries are not restricted; and, typically preset provisional boundaries, for example, as given by a specified rule to determine boundaries, exist. For example, provisional boundaries and the TPI of each zone are predefined according to the data capacity specified for the recording surface. Subsequently, at S12, HDC/MPU 23 measures the error rates in zones selected from the plurality of zones defined by the provisional boundaries.

Figure 4:
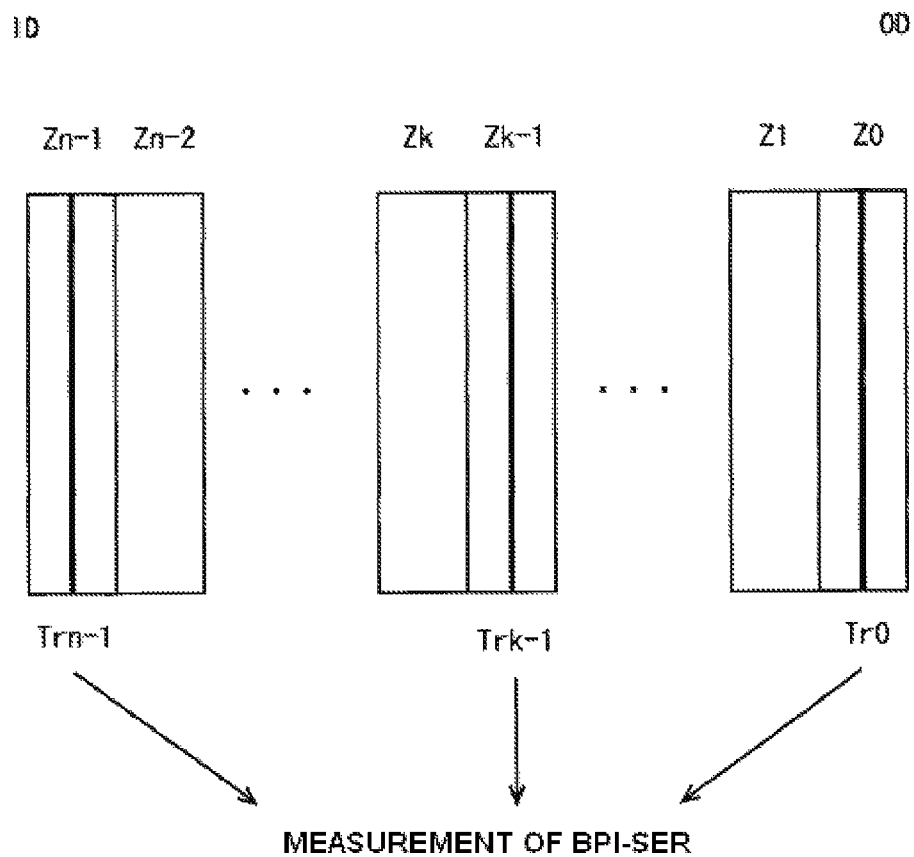
FIG. 4 is a drawing schematically illustrating a method to measure error rates in three zones, Zn1, Zk−1 and Z0, and to determine the relationship between the error rate and the BPI in the zones, in accordance with an embodiment of the present invention.

For example, with reference now to FIG. 4, in accordance with embodiments of the present invention, a drawing is shown that schematically illustrates a method in which HDC/MPU 23 measures the error rates in three zones, Zn1, Zk−1 and Z0, and determines the relationship between error rates and BPIs in the zones. HDC/MPU 23 measures the error rates at data tracks Trn−1, Trk−1 and Tr0 in the zones. Specifically, HDC/MPU 23 controls the actuator 16 to move the head-slider 12 to a target data track and writes data at a specific recording frequency, which is determined by the BPI, with the head-slider 12. Subsequently, it reads the data written with the head-slider 12 to measure the error rate. A method to measure the error rate disables the ECC function and counts data sectors where errors occur. The number of errors per the number of read samples is an error rate, for example, a soft error rate (SER). In an embodiment of the present invention, HDC/MPU 23 writes and reads all data sectors in a data track and calculates the average of the error rate by reading multiple times.

HDC/MPU 23 may use another error rate measurement method. In one embodiment of the present invention, the error rate is an indicator for the performance and reliability of HDD 1. Since the error rate changes with the BPI, the error rate may provide an indicator for a BPI setting. However, if another indicator different from an error rate exists for determining the BPIs of zones, HDC/MPU 23 may determine the BPIs according to that other indicator. The HDC/MPU 23 measures the error rates at different BPIs on one or more data tracks in each zone. Thus, in accordance with embodiments of the present invention, the relationship between the BPI and the error rate in each zone can be determined.

Figure 5:
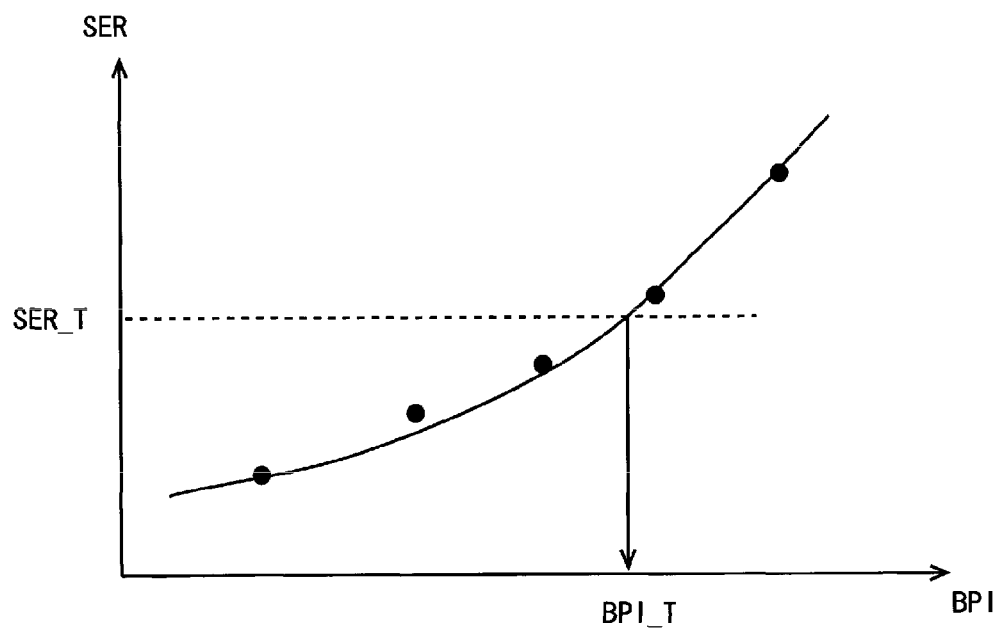
FIG. 5 is a graph showing an example relationship between the BPI and the error rate in a zone, in accordance with an embodiment of the present invention.

With reference now to FIG. 5, in accordance with embodiments of the present invention, a graph is shown that schematically depicts the relationship between the BPI and the error rate in a zone. The black filled circles are measurement values and the curve is a modeling function based on the measurement values. In the measurement example in FIG. 4, a recording surface is divided into n zones from Z0 to Zn−1; and, HDC/MPU 23 obtains three graphs, which provide functions, for three zones, Zn−1, Zk−1 and Z0.

An error rate is preset in HDD 1. The preset error rate provides a ceiling of error rate for a recording surface. HDC/MPU 23 determines the BPI of each zone so that the error rates at all data tracks are below the ceiling limit. HDC/MPU 23 calculates the BPI (BPI_T) corresponding to the specified error rate (SER_T) from a function obtained by error rate measurement in each zone.

In one embodiment of the present invention, HDC/MPU 23 measures the error rates in a portion of zones in order to reduce measurement time. However, HDC/MPU 23 may measure error rates in all zones. HDC/MPU 23 may measure error rates on data tracks in a zone. Thus, in an embodiment of the present invention, measuring error rates at data tracks in each of selected zones provides for balancing efficiency and accuracy of measurement.

Subsequently, at S13, HDC/MPU 23 calculates the relationship between the radial position on a recording surface of the magnetic-recording disk 11 and the BPI ceiling value BPI_T from the error rate measurement result, which is the relational expression of the graph shown in FIG. 5. The radial position can be represented by the servo address. HDC/MPU 23 has obtained BPR_Ts at a plurality of radial positions by the error rate measurement.

Figure 6:
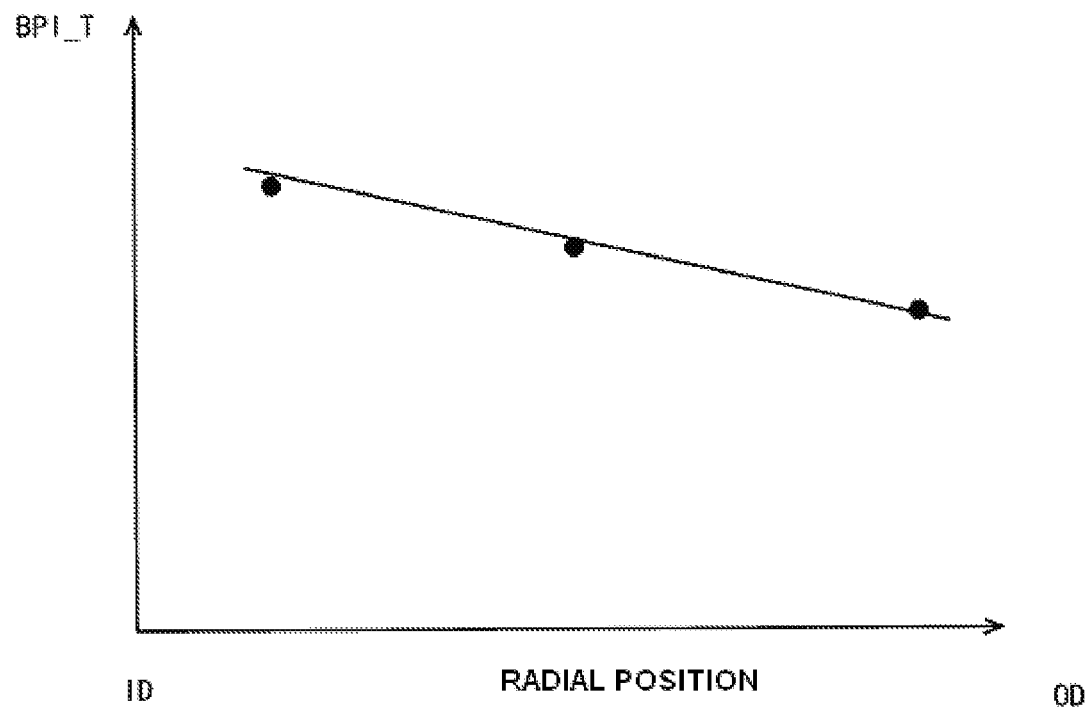
FIG. 6 is a graph showing an example of a modeling function showing the relationship between the radial position and the BPI_T, in accordance with an embodiment of the present invention.

With reference now to FIG. 6, in accordance with embodiments of the present invention, a graph is shown that illustrates an example of a modeling function showing the relationship between the radial position and the BPI_T calculated, as is next described. As the modeling function, HDC/MPU 23 may use a linear function, or alternatively, a higher-dimensional function, such as: a quadratic function, or a cubic function. By applying a specific modeling function to the values, HDC/MPU 23 calculates the relationship between the radial position and the BPI_T on the recording surface. At S14, HDC/MPU 23 determines the BPIs of respective zones after determining the relationship between the radial position and the BPI_T. This zone setting operation at S14 is next described specifically.

Figure 7:
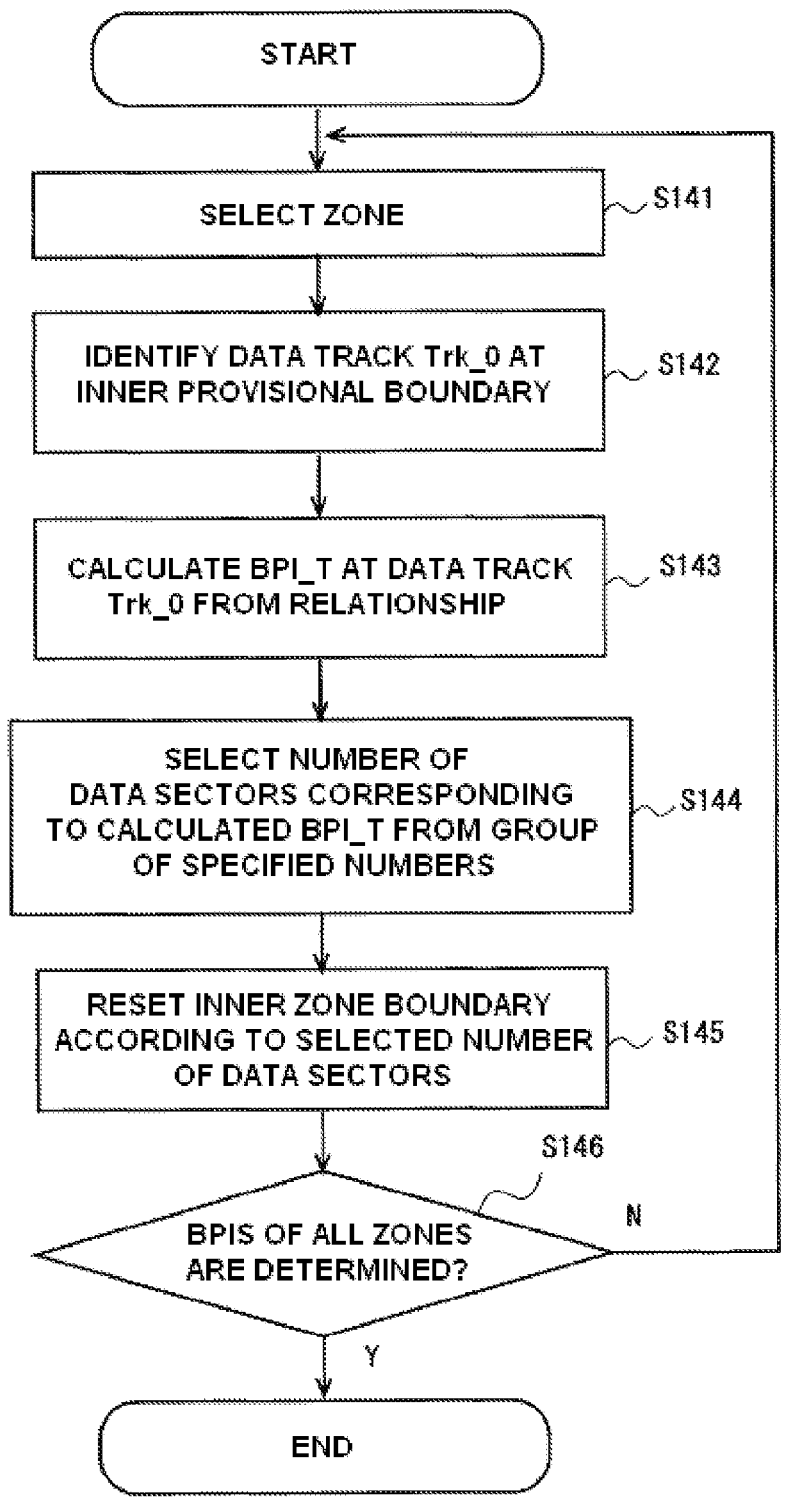
FIG. 7 is a flowchart showing the flow of a process including determining the BPI and resetting a boundary of each of the zones, in accordance with an embodiment of the present invention.

With reference now to FIG. 7, in accordance with embodiments of the present invention, a flowchart is shown that shows the flow of a process including determining the BPIs of the zones, and resetting the zone boundaries at new boundaries shifted from the provisional boundaries. HDC/MPU 23 determines the BPIs sequentially from the innermost zone, or alternatively, from the outermost zone. In addition, as illustrated in FIG. 8, in accordance with embodiments of the present invention, an example to select zones sequentially from the outermost zone toward the innermost zone is next described.

Figure 8:
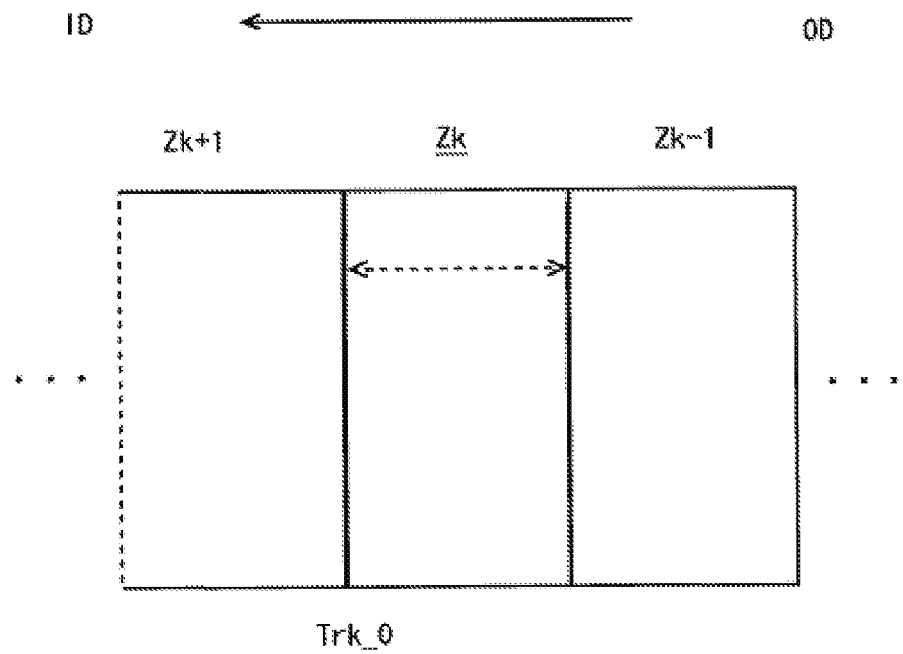
FIG. 8 is a diagram showing the process including determining the BPI and resetting a boundary of each of the zones, in accordance with an embodiment of the present invention.

As shown in FIGS. 7 and 8, at S141, HDC/MPU 23 selects a zone (zone Zk in FIG. 8), and, at S 142, identifies the ceiling limit BPI_T, which is a reference value, of the innermost data track, which is the data track on the inner boundary, Trk_0 in the zone. HDC/MPU 23 has determined the relationship between the reference value BPI_T and the radial position (refer to FIG. 6), and, at S143, calculates the reference value BPI_T of the innermost data track Trk_0 from the relationship.

Next, at S144, HDC/MPU 23 selects the number of data sectors corresponding to the calculated reference value BPI_T. HDC/MPU 23 has obtained beforehand a group of the numbers of data sectors, which are values each of which indicates the number of data sectors; and, each of the numbers is settable as the number of data sectors in a data track. HDC/MPU 23 selects an appropriate number of data sectors from the group according to the reference value BPI_T.

The specified numbers of data sectors are selected so that the number of split sectors (refer to FIG. 11) is within a specified range with respect to the number of servo sectors which have been written. In one embodiment of the present invention, the specified data, including the numbers of data sectors, utilized for the zone format setting are stored in a nonvolatile memory on a circuit board. Alternatively, in another embodiment of the present invention, HDC/MPU 23 may obtain the numbers of data sectors from the host 51. The details of selection of the number of data sectors according to the reference value BPI_T are subsequently described.

At S145, HDC/MPU 23, subsequently, resets the inner boundary of the zone Zk at a new boundary from the provisional boundary according to the selected number of data sectors. If an inner zone exists after resetting the zone Zk (N-branch after S146), at S141, HDC/MPU 23 selects the inner adjacent zone Zk+1 for the next setting process. If no inner zones exist (Y-branch after S146), the BPI setting processes for all zones have been completed. HDC/MPU 23 may omit the resetting process for the innermost zone Z0. Selecting the number of data sectors and resetting the zone boundary according to the reference value BPI_T is next described specifically.

Figure 9:
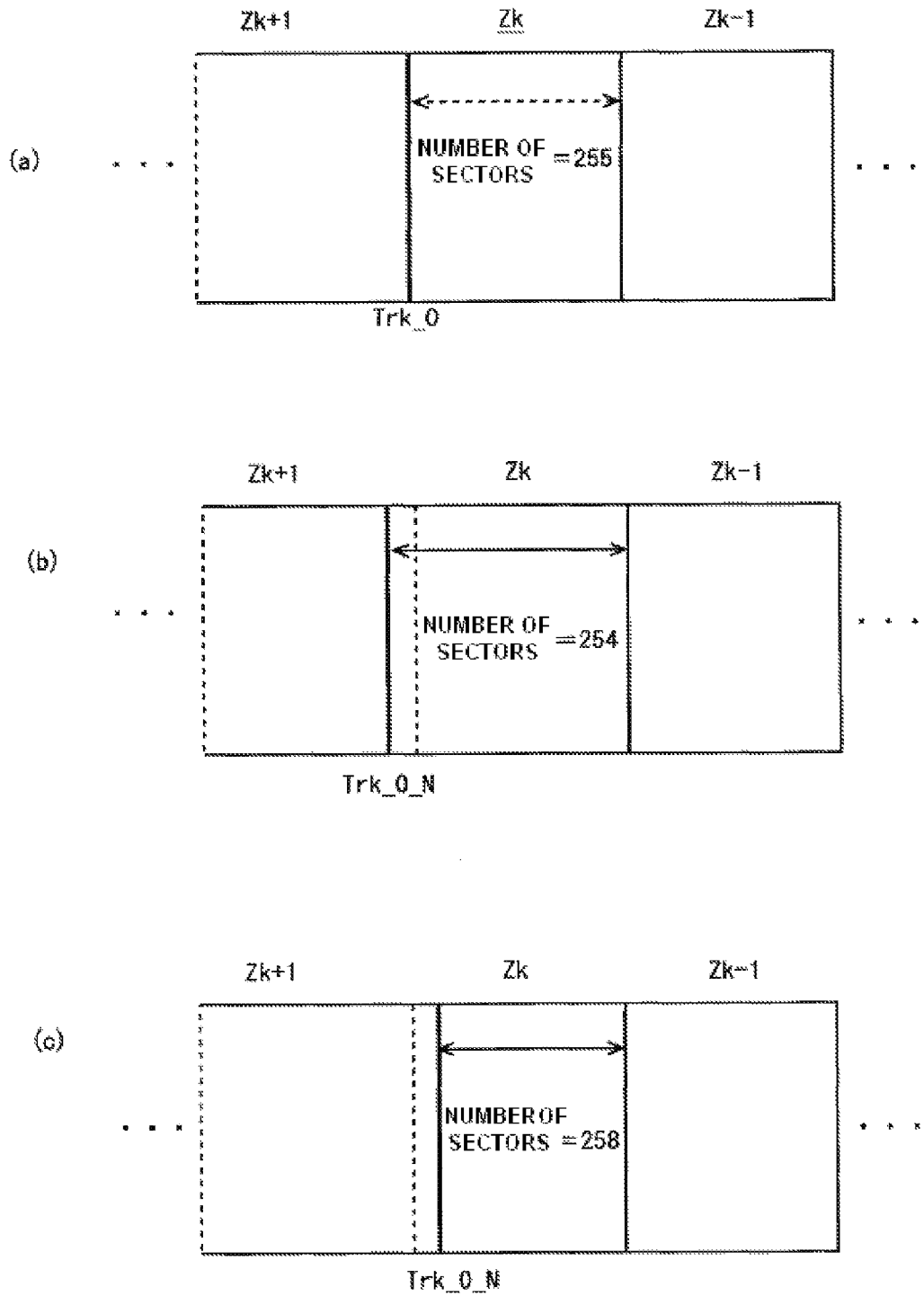
FIGS. 9(a), 9(b) and 9(c) are diagrams showing examples of resetting a number of data sectors and an inner boundary of the zone Zk, in accordance with an embodiment of the present invention.

With reference now to FIGS. 9(*a*), 9(*b*) and 9(*c*), in accordance with embodiments of the present invention, diagrams are shown that illustrate examples for resetting the number of data sectors and the inner boundary of the zone Zk. As described referring to the flowchart of FIG. 7, HDC/MPU 23 calculates the reference value BPI_T to the innermost data track Trk_0 in the zone Zk. In the example of FIG. 9(*a*), the number of data sectors indicating the BPI, which is no more than and the closest to the calculated reference value BPI_T, is assumed to be 255.

The value less than and the closest to 255 in the specified numbers of data sectors is assumed to be 254; and, the value more than and the closest to 255 in the specified numbers of data sectors is assumed to be 258. HDC/MPU 23 selects one of the two values. If it selects 254 as the number of data sectors to the zone Zk, HDC/MPU 23, as illustrated in FIG. 9(*b*), shifts inward the inner boundary of the zone Zk from the provisional boundary Trk_0 to a new boundary Trk_0_N.

Since the number of data sectors corresponding to the reference value BPI_T at the data track Trk_0 is 255, the data track with the reference value BPI_T corresponding to the number of data sectors of 254 exists at a position closer to the inside diameter of the magnetic-recording disk than the data track Trk_0. The number of data sectors in the inner zone Zk+1 adjacent to the zone Zk is smaller than that of the zone Zk. Thus, HDC/MPU 23 can increase the BPI of newly added data tracks by extending the zone Zk inward and, as a result, the data capacity of the recording surface is increased.

As HDC/MPU 23 has the relational expression between the radial position and the reference BPI_T, HDC/MPU 23 can identify the radial position, which gives the location of the data track, corresponding to the number of data sectors of 254, namely the data track whose BPI_T at the number of data sectors of 254 is larger than, and the closest to, the reference BPI_T. In a configuration for one embodiment of the present invention, HDC/MPU 23 sets the identified data track as the innermost data track Trk_0_N, which is at a zone boundary, in the zone Zk, which may provide for an optimized zone boundary in terms of the error rate and the capacity. HDC/MPU 23 may add a predetermined number of inner data tracks to the zone Zk.

A process in which HDC/MPU 23 selects the number of data sectors as 258 for the zone Zk is next described. Selecting a larger number, 258, for the zone Zk allows increasing the BPI of the zone Zk and, as a result, allows increasing the capacity of a recording surface. As shown in FIG. 9 (c), if HDC/MPU 23 selects the number of data sectors of 258 for the zone Zk, HDC/MPU 23 shifts outward the inner boundary of the zone Zk from the provisional boundary Trk_0 to a new boundary Trk_0_N.

At the data track Trk_0, the number of data sectors corresponding to the reference value BPI_T is 255. Thus, if the number of 258 is set for the data track, the error rate is larger than the one at the reference value BPI_T. HDC/MPU 23 shifts the inner boundary of the zone Zk outward so that the error rate of each data track in the zone Zk is smaller than the error rate of each data track at the reference value BPI_T.

HDC/MPU 23 has the relationship between the radial position and the reference BPI_T. HDC/MPU 23 can identify the radial position, which gives the location of the data track, corresponding to the number of data sectors of 258, namely the data track whose BPI_T at the number of data sectors of 258 is larger than, and the closest to, the reference BPI_T. In a configuration for another embodiment of the present invention, HDC/MPU 23 sets the identified data track as the innermost data track Trk_0_N, which is at the zone boundary, in the zone Zk. Thus, HDC/MPU 23 may provide an optimized zone boundary in terms of the error rate and the capacity. HDC/MPU 23 may remove a predetermined number of inner data tracks from the zone Zk.

HDC/MPU 23 may select the number of data sectors so that a zone boundary shifts inward, or alternatively, outward, depending on the circumstances. However, in a configuration for another embodiment of the present invention, HDC/MPU 23 chooses either the larger number, or alternatively, the smaller number, with reference to the relationship between the number of data sectors at the provisional boundary and the registered specific numbers.

In a method, in one embodiment of the present invention, HDC/MPU 23 chooses the specified number, which is 254 in the above-described example, closest to the number of data sectors at the provisional boundary, which is 255 in the above-described example. If the difference from the larger value and the difference from the smaller value are the same, HDC/MPU 23 may choose either. The subsequent zone boundary resetting method is the same as the above description. In this way, in accordance with embodiments of the present invention, selecting an appropriate specified number of data sectors with reference to the relationship between the number of data sectors calculated at a provisional boundary and the specified numbers of data sectors allows increasing the data capacity of the recording surface.

As described referring to the flowchart of FIG. 7, HDC/MPU 23 calculates the number of data sectors corresponding to the reference value BPI_T. In this calculation, HDC/MPU 23 in an embodiment of the present invention corrects variations in the gap between the servo sector and the data sector.

Figure 10:
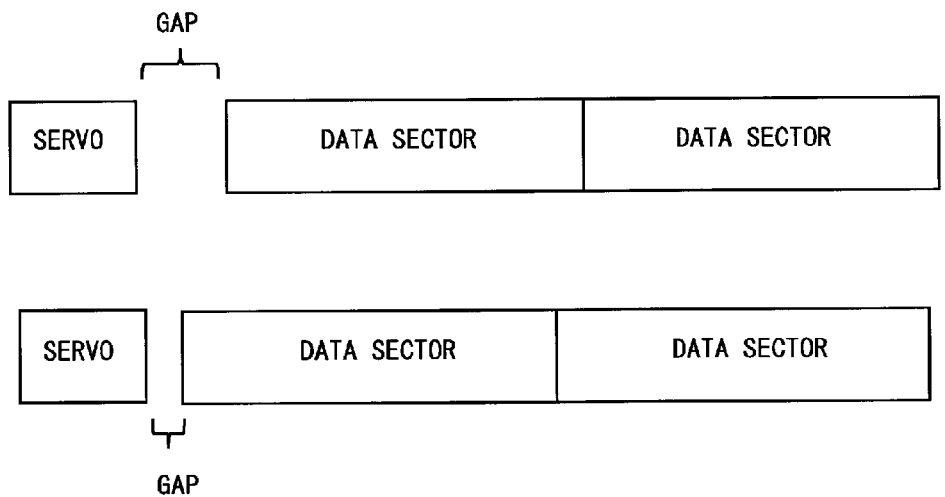
FIG. 10 is a drawing schematically illustrating a gap between a servo sector and a data sector, in accordance with an embodiment of the present invention.

With reference now to FIG. 10, in accordance with embodiments of the present invention, a drawing is shown that schematically illustrates a gap between a servo sector and a data sector. There exists a gap between a servo sector and the following data sector. The gap varies in different data tracks. If the gap is large, the data sector length is shortened to increase the BPI, in order to contain a specified number of data sectors between servo sectors. Therefore, even if the same number of data sectors is contained at the same radial position, the BPI at the data track varies with the gap. Thus, HDC/MPU 23 determines the gap by measurement, and calculates the number of data sectors by use of the gap.

In a method of an embodiment of the present invention, HDC/MPU 23 calculates the number of data sectors corresponding to the reference value BPI_T of a target data track after measuring the gap in the target data track. For example, HDC/MPU 23 can calculate the value of the gap from a measured value of time between a servo address mark in a servo sector and a data address mark in a data sector. The servo address mark is data providing the reference timing in reading of the servo sector. In an embodiment of the present invention, HDC/MPU 23 measures all gaps in the target data track and uses the average in calculation of the number of data sectors.

Otherwise, HDC/MPU 23 starts the BPI setting process for a zone after measuring gaps in data tracks selected from a recording surface. HDC/MPU 23 applies a modeling function to measured gap values to calculate a function, which provides a formula, indicating the relationship between the radial position, which gives the location of the data track, and the gap. In the calculation of the number of data sectors in determining the BPI for a zone, the gap calculated with the formula is used. In accordance with an embodiment of the present invention, correcting variations in gaps with the radial position in the calculation of the number of data tracks in this way provides more precise BPI setting.

If the dimensional tolerance of a write element in the track width direction is large, a portion of an adjacent data track is erased. If the erasure amount of an adjacent data track is large, the error rate gets worse. Thus, if the dimensional tolerance of a write element in the track width direction is large, the BPI larger than a specified value is set so that the error rate is no more than a specified rate regardless of the data erasure.

In a method of an embodiment of the present invention, HDC/MPU 23 writes data for measurement on a track for error rate measurement in zones selected from a plurality of zones defined by provisional boundaries. Subsequently, HDC/MPU 23 writes data on either one of, or both of, inner and outer adjacent tracks of the track for error rate measurement, and then measures the error rate. HDC/MPU 23 determines the BPI with the measured error rates. In accordance with an embodiment of the present invention, the BPI setting according to the error rate in measuring the effect on an adjacent track provides a more appropriate BPI setting.

As set forth above, embodiments of the present invention have been described by way of examples; but, embodiments of the present invention are not limited to the above-described examples, as embodiments of the present invention can, of course, be modified in various ways within the spirit and scope of embodiments of the present invention. For example, embodiments of the present invention can be applied to disk drives with data-storage disks other than magnetic-recording disks, such as: optical disks, and magneto-optical disks. For another example, although the number of data sectors at a boundary may be calculated according to the measured BPI, a HDD may select a value to match the number of data sectors calculated with reference to a specified BPI from a specified group of numbers, and reset a zone boundary position according to the value selected to match the number of data sectors calculated with reference to the specified BPI from the specified group of numbers.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for dividing a data area on a disk into a plurality of concentric zones and determining a format for each zone so that data tracks in said zone have a same number of data sectors, said method comprising:
   dividing said data area into said plurality of zones with provisional boundaries;
   determining a linear recording density for a selected zone;
   selecting said number of data sectors per data track corresponding to said determined linear recording density from specified values; and
   resetting a boundary of said zone at a new boundary shifted from said provisional boundary according to a selected value;
   wherein said number of data sectors per data track for said provisional boundary of said zone corresponding to said linear recording density for said provisional boundary is calculated, and said boundary of said zone is shifted according to a difference between said calculated number of data sectors and said selected value.

2. The method according to claim 1, wherein an error rate is measured in said data area, and said linear recording density is determined according to said error rate.

3. The method according to claim 2, wherein error rates are measured in a portion of said plurality of zones and a relationship between said error rate and said linear recording density in said portion of said plurality of zones is determined, and said linear recording density corresponding to a reference error rate of said selected zone is determined from said relationship.

4. The method according to claim 2, wherein an error rate measurement in said data area measures an effect on an adjacent track by a recording element.

5. The method according to claim 1, wherein said boundary of said zone is shifted inward from said provisional boundary if said selected value is less than said calculated number of data sectors.

6. The method according to claim 1, wherein said boundary of said zone is shifted outward from said provisional boundary if said selected value is larger than said calculated number of data sectors.

7. The method according to claim 1, wherein a calculation of said number of data sectors corrects variations in gaps between servo sectors and data sectors with radial position on said disk.

8. The method according to claim 1, wherein a value smaller than or larger than said calculated number of data sectors is selected from said specified values according to a specified condition; said boundary of said zone is shifted inward from said provisional boundary if said selected value is less than said calculated number of data sectors; and said boundary of said zone is shifted outward from said provisional boundary if said selected value is larger than said calculated number of data sectors according to said selected value.

9. The method according to claim 8, wherein said value closest to said calculated number of data sectors is selected from said specified values.

10. The disk drive according to claim 1, wherein said controller is configured to shift inward said boundary of said zone from said provisional boundary if said selected value is less than said calculated number of data sectors.

11. The disk drive according to claim 1, wherein said controller is configured to shift outward said boundary of said zone from said provisional boundary if said selected value is larger than said calculated number of data sectors.

12. The disk drive according to claim 1, wherein said controller is configured to correct variations in gaps between servo sectors and data sectors with radial position on said disk in a calculation of said number of data sectors.

13. The disk drive according to claim 1, wherein said controller is configured to select a value smaller than or larger than said calculated number of data sectors from said specified values according to a specified condition, is configured to shift inward said boundary of said zone from said provisional boundary if said selected value is less than said calculated number of data sectors, and is configured to shift outward said boundary of said zone from said provisional boundary if said selected value is larger than said calculated number of data sectors.

14. The disk drive according to claim 13, wherein said controller is configured to select said value closest to said calculated number of data sectors from specified values.

15. A disk drive comprising:
   a disk comprising a data area;
   a head for accessing said data area;
   a moving mechanism for supporting and moving said head in proximity with said data area; and
   a controller configured to divide said data area into a plurality of zones with provisional boundaries, configured to determine a linear recording density for a selected zone, configured to select a number of data sectors per data track corresponding to said determined linear recording density from specified values, and configured to reset a boundary of said zone at a new boundary shifted from a provisional boundary;
   wherein said controller is configured to calculate said number of data sectors per data track for said provisional boundary of said zone corresponding to said linear recording density for said provisional boundary, and is configured to shift said boundary of said zone according to a difference between said calculated number of data sectors and said selected value.

16. The disk drive according to claim 15, wherein said controller is configured to measure an error rate in said data area, and is configured to determine said linear recording density according to said error rate.

17. The disk drive according to claim 16, wherein said controller is configured to measure error rates in a portion of said plurality of zones, is configured to determine a relationship between said error rate and said linear recording density in said portion of said plurality of zones, and is configured to determine said linear recording density corresponding to a reference error rate of said selected zone from said relationship.

18. The disk drive according to claim 16, wherein said controller is configured to measure an effect on an adjacent track by a recording element in an error rate measurement in said data area with said head.

* * * * *